United States Patent
Wang et al.

(10) Patent No.: US 8,466,666 B2
(45) Date of Patent: Jun. 18, 2013

(54) MULTI-STAGE VOLTAGE REGULATING CIRCUIT WITH AUTOMATIC THERMAL COMPENSATION AND REGULATING METHOD THEREOF

(75) Inventors: Der-Jiunn Wang, Zhubei (TW); Kuo-Chen Tsai, Hsinchu (TW)

(73) Assignee: Richtek Technology Corp., ChuPei (TW)

( * ) Notice: Subject to any disclaimer, the term of this patent is extended or adjusted under 35 U.S.C. 154(b) by 321 days.

(21) Appl. No.: 13/079,919

(22) Filed: Apr. 5, 2011

(65) Prior Publication Data

US 2012/0126770 A1  May 24, 2012

(30) Foreign Application Priority Data

Nov. 19, 2010  (TW) ................................ 99139918 A

(51) Int. Cl.
*G05F 1/40* (2006.01)

(52) U.S. Cl.
USPC ............ 323/271; 323/312; 323/907; 327/535

(58) Field of Classification Search
USPC ................. 323/271, 310–317, 907; 327/535, 327/536
See application file for complete search history.

(56) References Cited

U.S. PATENT DOCUMENTS

| | | | | |
|---|---|---|---|---|
| 8,040,176 | B2 * | 10/2011 | Ito | 327/540 |
| 8,049,552 | B2 * | 11/2011 | Byeon | 327/536 |
| 2009/0231044 | A1 * | 9/2009 | Iwaida et al. | 331/10 |
| 2010/0264899 | A1 * | 10/2010 | Ito et al. | 323/349 |

* cited by examiner

*Primary Examiner* — Jessica Han

(57) ABSTRACT

A multi-stage voltage regulating circuit and method with automatic temperature compensation comprises a plurality of charge-pumps, a temperature compensator, a comparative unit and a control logic circuit; wherein, the temperature compensator detects the ambient temperature and outputs a reference voltage related to the ambient temperature, the comparative unit compares the voltage of the output power source to the reference voltage output by the temperature compensator and outputs a comparative signal based on the comparison, and the control logic circuit controls the charging/discharging operations of the charge-pumps based on the comparative signal and voltages of input power sources connected to said charge-pumps to automatically regulate the voltage of the output power source.

11 Claims, 3 Drawing Sheets

MULTI-STAGE VOLTAGE REGULATING CIRCUIT WITH AUTOMATIC THERMAL COMPENSATION AND REGULATING METHOD THEREOF

BACKGROUND OF THE INVENTION

1. Field of the Invention

The present invention is related to a voltage regulator circuit and particularly to a multi-stage voltage regulating circuit with automatic thermal compensation and a multi-stage voltage regulating method thereof.

2. Brief Description of the Related Art

The voltage regulator circuit is used for supplying the power required by a liquid crystal display panel. Because a gate-on voltage of the thin film transistor (TFT) in the liquid crystal display panel increases with a decreasing temperature, the voltage of the power of the liquid crystal display panel has to be increased in order to maintain a normal operation of the liquid crystal display panel in an environmental of low temperature. However, it causes that the function of the liquid crystal display panel becomes ineffective after the operation temperature being increased although increasing the voltage of the power is able to solve the problem of starting the liquid crystal display panel at the low temperature.

In order to solve the problem of ineffectiveness of the function of the liquid crystal display panel, conventionally, the boost-type voltage regulating circuit with automatic temperature compensation as shown in FIG. 1 or the fixed-mode charge-pump type voltage regulating circuit with automatic temperature compensation as shown in FIG. 2 is employed to supply the power of the liquid crystal display panel so as to lower the output voltage of the power after the liquid crystal display panel being in a state of normal operation and the operation temperature increasing for improving the deficiency of the ineffective function.

Nevertheless, the boost-type voltage regulating circuit with automatic temperature compensation as shown in FIG. 1 needs components such as inductors and power transistors to result in that it is hard to lower the cost of the voltage regulating circuit; the fixed-mode charge-pump type voltage regulating circuit with automatic temperature compensation as shown in FIG. 2 is merely capable of regulating the voltage in a fixed range such that the improved function is limited significantly.

SUMMARY OF THE INVENTION

Accordingly, an object of the present invention is to provide a multi-stage voltage regulating circuit and method with automatic temperature compensation not only to lower the manufacturing cost but also to maintain a high effective function.

In order to achieve the preceding object, the multi-stage voltage regulating circuit with automatic temperature compensation according to the present invention is adaptable for automatically regulating a voltage of an output power source based on an ambient temperature, and comprises a plurality of charge-pumps, a temperature compensator, a comparative unit and a control logic circuit; wherein, each charge-pump connects with an input power source respectively, the temperature compensator detects the ambient temperature and outputs a reference voltage related to the ambient temperature, the comparative unit couples with the temperature compensator to compare the voltage of the output power source with the reference voltage output by the temperature compensator and produces a comparative signal based on the comparison, and the control logic circuit couples with comparative unit and controls the charging/discharging operations of the charge-pumps based on the comparative signal and voltages of input power sources connected to said charge-pumps to automatically regulate the voltage of the output power source.

In a preferred embodiment according to the present invention, the control logic circuit of the multi-stage voltage regulating circuit with automatic temperature compensation further comprises a mode determinative logic circuit and a mode operative logic circuit; the mode determinative logic circuit determines which ones of the charge-pumps should be enabled based on the voltages of the input power sources connected to the charge-pumps and the voltage of the output power source, and the mode operative logic circuit being coupled to the mode determinative logic circuit to control charge/discharge operations of the enabled charge-pumps according to the comparative signal; wherein the mode determinative logic circuit is based on a principle that a sum of the voltages of the input power sources connected to the enabled charge-pumps is greater than the voltage of the output power source with a preset value.

In the preferred embodiment according to the present invention, each of the charge-pumps of the multi-stage voltage regulating circuit with automatic temperature compensation further consists of a switch set having two switches connecting with each other in series and a capacitor being connected to a node between the two switches, wherein the switch set consists of a PMOS transistor and a NMOS transistor.

In the preferred embodiment according to the present invention, the temperature compensator of the multi-stage voltage regulating circuit with automatic temperature compensation outputs the reference voltage is between a high limit voltage value and a low limit voltage value.

In the preferred embodiment according to the present invention, the comparative unit of the multi-stage voltage regulating circuit with automatic temperature compensation further comprises a comparator, a first resistor and a second resistor; the comparator has a first input end, a second input end and an output end with the first input end receiving the reference voltage and the output end outputting the comparative signal; the first resistor with an end being connected to the output power source and another end being connected to said second input end; the second resistor with an end being connected to the second input end and another end being grounded.

Further, a method of multi-stage voltage regulation with automatic temperature compensation adaptable for automatically regulating a voltage of an output power source of a voltage regulating circuit according to an ambient temperature, wherein the voltage regulating circuit has a plurality of charge-pumps with each of the charge-pumps connecting with an input power source respectively; the method of multi-stage voltage regulation with automatic temperature compensation comprises following steps: detecting the ambient temperature and outputting a reference voltage according to the ambient temperature, comparing the voltage of the output power source to the reference voltage and outputting a comparative signal according to the comparison, and controlling charging/discharging operations of the charge-pumps based on the comparative signal and voltages of input power sources connected to the charge-pumps and automatically regulating the voltage of the output power source.

Wherein, the step of controlling charging/discharging operations of the charge-pumps further comprises following steps: determining which ones of said charge-pumps should be enabled according to the voltages of the input power sources connected to said charge-pumps and the voltage of the output power source, and controlling charging/discharging operations of the enabled charge-pumps based on said comparative signal.

Wherein, a sum of the voltages of the input power sources connected to the enabled charge-pumps being greater than the voltage of the output power source with a preset value is the principle for deciding which charge-pumps should be enabled.

Wherein, the output reference voltage based on the ambient temperature is between a high limit voltage value and a low limit voltage to ensure that the voltage regulating circuit operates normally.

It can be understood from the foregoing that the multi-stage voltage regulating circuit and method with automatic temperature compensation according to the present invention are capable of lowering the manufacturing cost because no inductors and power transistors are needed in the circuit; besides, the circuit and method are capable of maintaining a high effective function due to the voltage of the output power source being regulated timely with the temperature rise of the liquid crystal display panel.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Figure 1:
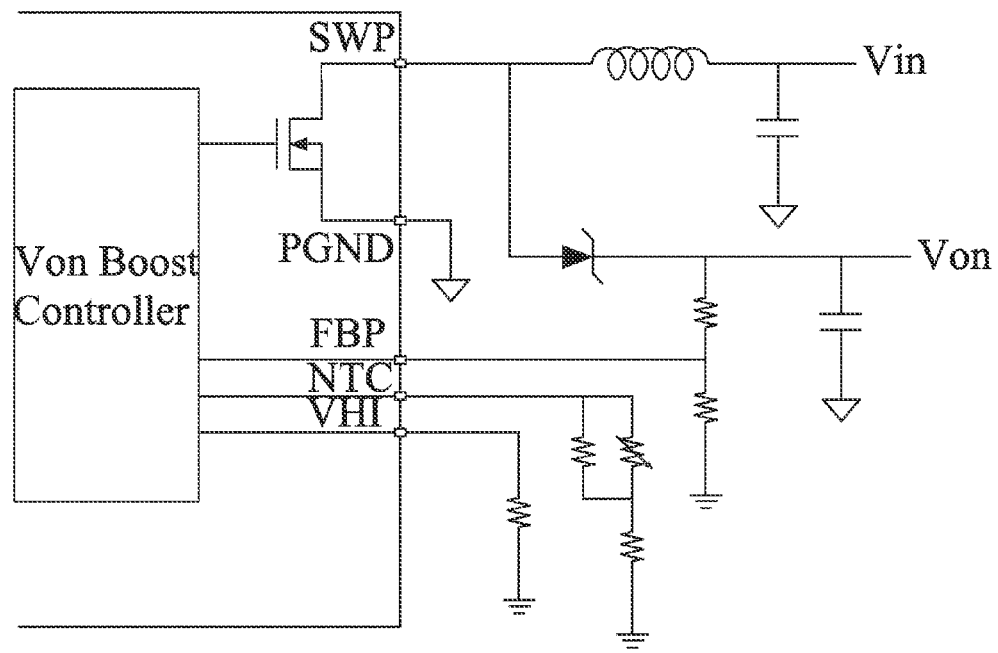
FIG. 1 is a circuit diagram illustrating the conventional boost-type voltage regulating circuit with automatic thermal compensation.
Figure 2:
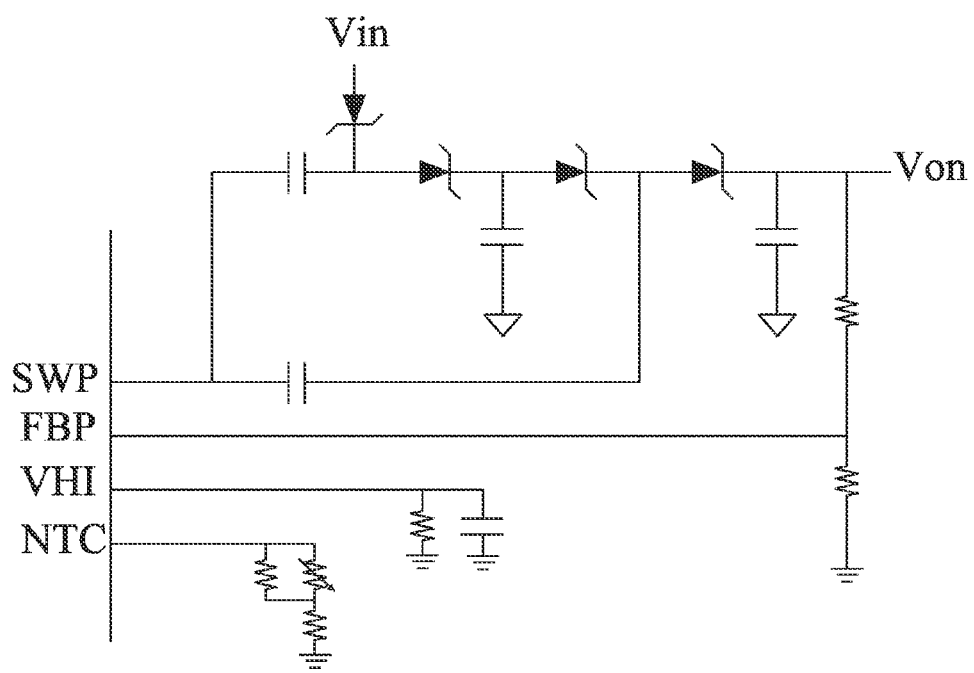
FIG. 2 is a circuit diagram illustrating the conventional fixed-mode charge-pump type voltage regulating circuit with automatic thermal compensation.
Figure 3:
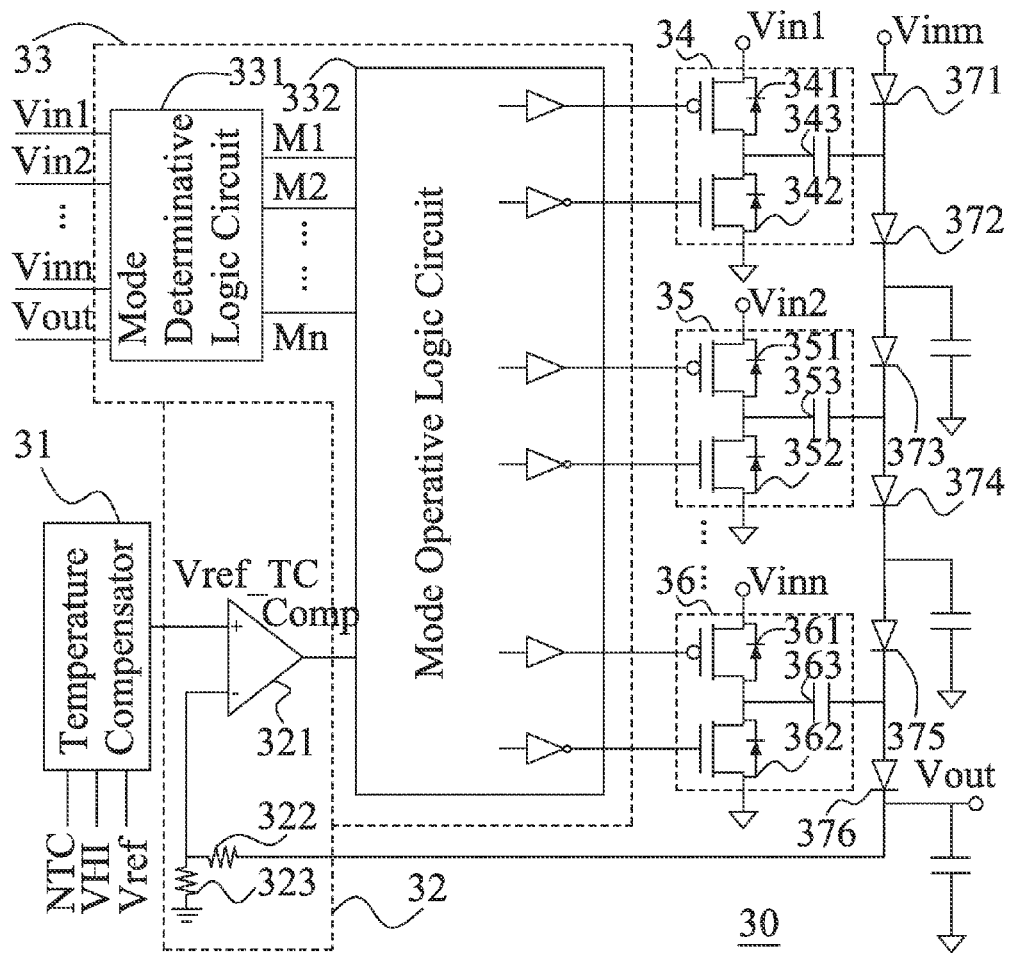
FIG. 3 is a circuit diagram illustrating a preferred embodiment of a multi-stage voltage regulating circuit with automatic thermal compensation according to the present invention.

Referring to FIG. 3, a preferred embodiment of a multi-stage voltage regulating circuit with automatic thermal compensation according to the present invention is illustrated. The multi-stage voltage regulating circuit with automatic thermal compensation 30 is suitable for regulating voltage of the output power source Vout automatically based on a detected ambient temperature.

It can be seen in FIG. 3 that the multi-stage voltage regulating circuit with automatic thermal compensation 30 includes a plurality of charge-pumps 34, 35, . . . , 36, a temperature compensator 31, a comparative unit 32, and a control logic circuit 33. The control logic circuit 33 further has a mode determinative logic circuit 331 and a mode operative logic circuit 332.

Wherein, the charge-pump 34 consists of a switch set composed of a PMOS transistor 341 and an NMOS transistor 342 connecting with each other in series and a capacitor 343 connecting with a connecting node between the PMOS transistor 341 and the NMOS transistor 342; the charge-pump 35 consists of another switch set composed of a PMOS transistor 351 and an NMOS transistor 352 connecting with each other in series and another capacitor 353 connecting with a connecting node between the PMOS transistor 351 and the NMOS transistor 352; and so on, the charge-pump 36 consists of a further switch set composed of a PMOS transistor 361 and an NMOS transistor 362 connecting with each other in series and a further capacitor 363 connecting with a connecting node between the PMOS transistor 361 and the NMOS transistor 362.

Besides, an end of each of the PMOS transistors 341, 351, . . . , 361 is connected to one of input power sources Vin1, Vin2, . . . , and Vinn respectively. An end of the capacitor 343 is connected to a further input power source Vinm via a diode 371 and connected to an end of the capacitor 353 via diodes 372, 373; the capacitor 353 is connected to an end of the capacitor 363 via diodes 374, 375; an end of the capacitor 363 is connected to the output power source Vout via the diode 376.

The comparative unit 32 couples with the temperature compensator 31 and consists of a comparator 321 and resistors 322, 323. The comparator 321 has a positive input end, a negative input end, and an output end; the resistor 322 has an end connecting with the output power source Vout and another end connecting with the negative input end of the comparator 321; the resistor 323 has an end connecting with the negative input end of the comparator 321 and another end being grounded. Hence, the comparator 321 is capable of employing the positive input end to receive a reference voltage Vref_TC output by the temperature compensator 31 based on a detected ambient temperature to compare the output power source Vout fed back via the resistors 322, 323, and a comparative signal Comp, which represents a compared result, is transmitted to the mode operation logic circuit 332 via the output end.

Meanwhile, the mode operative logic circuit 332 controls charging/discharging operations of the charge-pumps 34, 35, . . . , 36 according to the comparative signal Comp to regulate the voltage of the output power source Vout automatically; it is preferable that the voltage regulation is operated with reference to enabling signals M1~Mn output by the mode determinative logic circuit 331 at the same time. The mode determinative logic circuit 331 determinates whether the enabling signals M1~Mn perform enabling jobs or not according to the input power sources Vin1, Vin2, Vinn connected to the charge-pumps 34, 35, . . . , 36, and the voltage of the output power source Vout.

Wherein, the mode determinative logic circuit 331 is based on a principle that a sum of voltage values of the input power sources Vin1, Vin2, Vinn connected to the charge-pumps 34, 35, . . . , 36 is greater than a voltage value of the output power source Vout with a preset value to determine operations of which ones of the charge-pumps 34, 35, . . . , 36 being enabled. Expressions for the operations are listed hereinafter:

$$VCP_n = Vinm + \Sigma Vinn \tag{1}$$

$$VCP_{n-1} - \Delta V_{n-1} < Vout < VCP_n - \Delta V_n \tag{2}$$

In preceding expressions, $VCP_n$ represents the sum of voltage values of the input power sources Vin1, Vin2, . . . , Vinn connected to the charge-pumps 34, 35, . . . , 36 when n pieces of the charge-pumps 34, 35, . . . , 36 are enabled to operate; $VCP_{n-1}$ represents the sum of voltage values of the input power sources Vin1, Vin2, . . . , Vinn connected to the charge-pumps 34, 35, . . . 36 when n−1 pieces of the charge-pumps 34, 35, ..., 36 are enabled to operate; $\Delta V_n$ and $\Delta V_{n-1}$ represents voltage drops of the diodes connected to the enabled charge-pumps 34, 35, ..., 36.

Results of the voltage drops of the diodes connected to the enabled charge-pumps 34, 35, ..., 36 have been considered in the preceding expressions; that is, the sum of the voltage values of the input power sources Vin1, Vin2, ..., Vinn connected to the charge-pumps 34, 35, ..., 36 which are enabled by the enabling signals M1~Mn output by the mode determinative logic circuit 331 is greater than the voltage of the output power source Vout with an amount of the voltage drops resulting from the diodes to avoid that an actual regulated voltage of the output power source Vout is impossible to meet a requirement of the reference voltage Vref_TC output by the temperature compensator 31 according to the detected ambient temperature.

Figure 4:
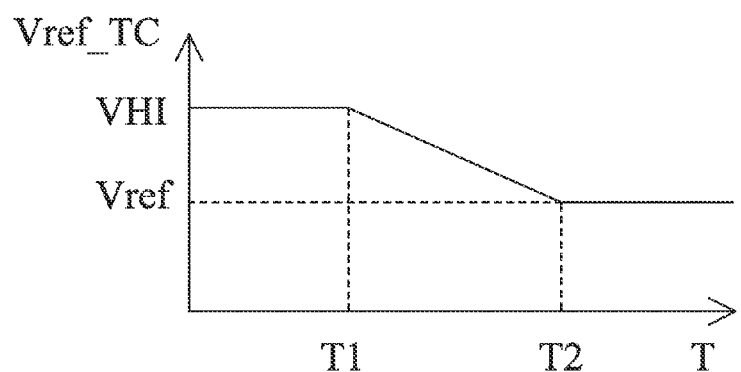
FIG. 4 illustrates a wave form diagram of a reference voltage output via the temperature compensator shown in FIG. 3.

Referring to FIG. 4, a wave form of the reference voltage output by the temperature compensator 31 is illustrated. It can be seen in the figure that the temperature compensator 31 outputs the reference voltage Vref_TC related to the detected ambient temperature only when the temperature is between T1 and T2; when the temperature is below T1, the reference voltage maintains at a high limit voltage value VHI, and when the temperature increases over T2, the reference voltage maintains at a low limit voltage value Vref. Hence, the voltage of the regulated output power source Vout can be secured between the high limit voltage value VHI and the low limit voltage value Vref so as to maintain a normal operation of the application circuit.

Figure 5:
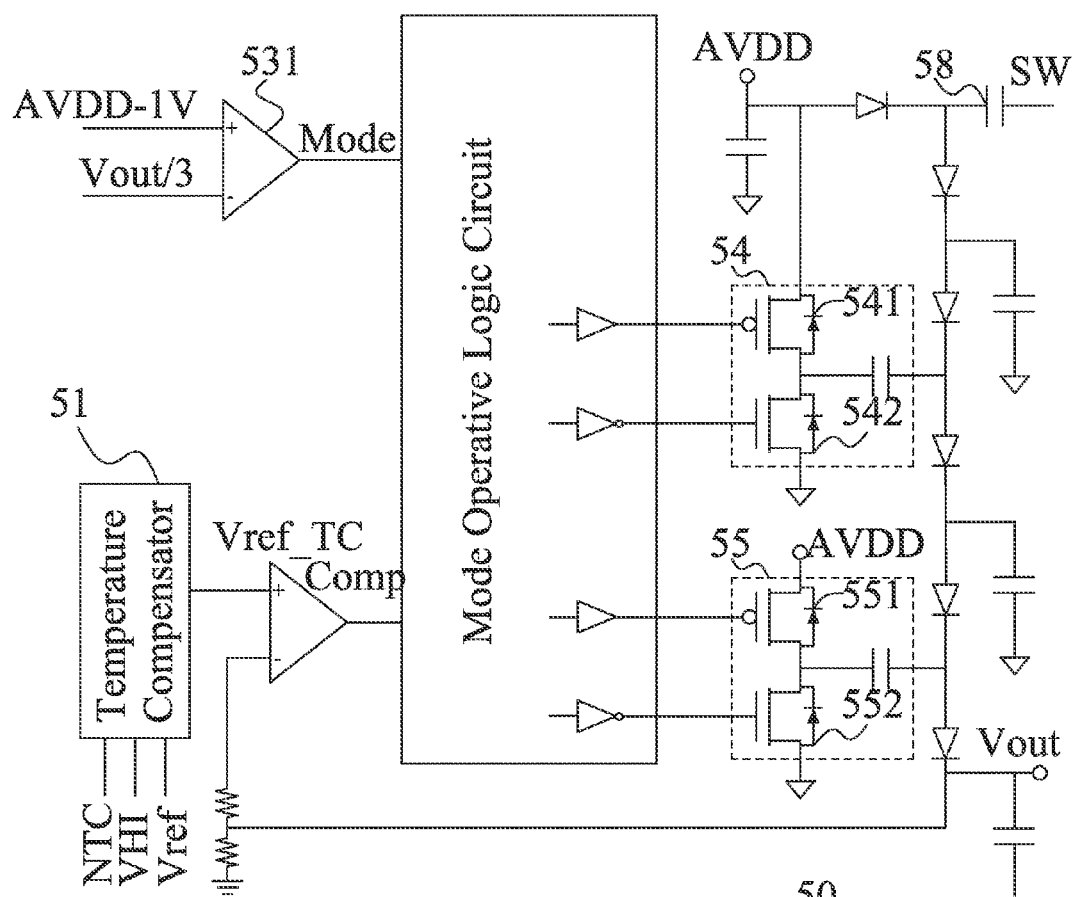
FIG. 5 is a circuit diagram of an implementation of a two-stage voltage regulating circuit with automatic thermal compensation according to the preferred embodiment of the present invention.

Referring to FIG. 5, an implementation of a two-stage voltage regulating circuit with automatic thermal compensation is illustrated. It can be seen in the figure that the two-stage voltage regulating circuit 50 employs two charge-pumps 54, 55 only, and the two charge-pumps 54, 55 are connected to a common input power source AVDD. Further, a basic input power source Vinm in FIG. 3 is replaced with the same input power source AVDD and connected to a power switch SW of the voltage regulator of the application circuit for regulating and outputting 1 time of AVDD via a capacitor 58. Therefore, the basic output power source Vout is 2 times of AVDD, and it is capable of regulating the output power source Vout to 3 times or 4 times of AVDD optionally.

The mode determinative logic circuit shown in FIG. 5 has been simplified as a comparator 531; the comparator 531 has a positive input end connecting with the input power source AVDD and a negative input end connecting with the output power source Vout; a voltage obtained from the input power source AVDD subtracted by 1 volt is compared with a voltage obtained from the output power source Vout divided by 3, and an enabling signal Mode, which represents a compared result after comparison, is output via output ends of the comparator 531. It is noted that the input power source AVDD being subtracted by 1 volt is to consider the voltage drop resulting from the diodes connected to the charge-pumps 54, 55.

Thus, the two-stage voltage regulating circuit 50 with automatic temperature compensation operates in a mode of presetting 4 times of AVDD after the power starts; when the temperature increases gradually to decrease the reference voltage Vref_TC output by the temperature compensator 51 so as to lower the voltage of the output power source Vout till being less than 3*(AVDD−1), the comparator 531 outputs a high level enabling signal Mode to enable one of the switch sets consisting of the PMOS transistors 541, 551 and the NMOS transistors 542, 552 of the two charge-pumps 54, 55 for enhancing efficiency of the circuit.

On the other hand, when the temperature decreases gradually to increase the reference voltage Vref_TC output by the temperature compensator 51 so as to heighten the voltage of the output power source Vout till being greater than 3*(AVDD−1), the comparator 531 outputs a low level enabling signal Mode to enable the switch sets consisting of the PMOS transistors 541, 551 and the NMOS transistors 542, 552 of the two charge-pumps 54, 55 for maintaining the voltage of the output power source Vout at a needed level.

From the foregoing, it can be concluded that a method for regulating a multi-stage voltage with automatic temperature compensation is suitable for regulating a voltage of the output power source of a voltage regulating circuit automatically based on an ambient temperature; the voltage regulating circuit has multiple charge-pumps and each of the charge-pumps is connected to an input power source respectively. The method for regulating the multi-stage voltage comprises following steps: detecting an ambient temperature and outputting a reference voltage based on the detected ambient temperature, comparing the voltage of the output power source to the reference voltage and outputting a comparative signal according to the comparison, and controlling operations of charging and discharging of the charge-pumps according to the comparative signal and the voltage of the input source so as to regulate the voltage of the output power source automatically.

Wherein, steps of controlling the operation of charging/discharging of the charge-pumps further include deciding to enable which ones of the charge-pumps according to the voltages of the input power sources connected to the charge-pumps and output power source, and controlling the operations of the charging/discharging of the enabled charge-pumps according to the comparative signal.

Wherein, a sum of the voltages of the input power sources connected to the enabled charge-pumps being greater than the voltages of the output power source with a preset value is a principle to decide which ones of the charge-pumps should be enabled.

Wherein, the reference voltage being output according to the detected ambient temperature is between a high limit voltage value and a low limit voltage value to secure the circuit being capable of operating normally.

While the invention has been described with referencing to a preferred embodiment thereof, it is to be understood that modifications or variations may be easily made without departing from the spirit of this invention, which is defined by the appended claims.

What is claimed is:

1. A multi-stage voltage regulating circuit adaptable for automatically regulating a voltage of an output power source based on an ambient temperature comprising:
   a plurality of charge-pumps with each of the charge-pumps being connected to an input power source respectively;
   a temperature compensator detecting the ambient temperature and outputting a reference voltage based on the ambient temperature;
   a comparative unit being coupled to the temperature compensator, comparing the voltage of the output power source with the reference voltage to obtain a compared result, and outputting a comparative signal according to the compared result; and
   a control logic circuit being coupled to the comparative unit, controlling the charge-pumps to perform charge/discharge operations in accordance with the comparative signal and the voltages of the input power sources connected to said charge-pumps for automatically regulating the voltage of the output power source.

2. The multi-stage voltage regulating circuit as defined in claim 1, wherein the control logic circuit further comprises:

a mode determinative logic circuit determining which ones of the charge-pumps should be enabled based on the voltages of the input power sources connected to the charge-pumps and the voltage of the output power source; and a mode operative logic circuit being coupled to the mode determinative logic circuit to control charge/discharge operations of the enabled charge-pumps according to the comparative signal.

3. The multi-stage voltage regulating circuit as defined in claim 2, wherein the mode determinative logic circuit is based on a principle that a sum of the voltages of the input power sources connected to the enabled charge-pumps is greater than the voltage of the output power source with a preset value.

4. The multi-stage voltage regulating circuit as defined in claim 1, wherein each of the charge-pumps further comprises:

a switch set having two switches connecting with each other in series; and a capacitor being connected to a node between the two switches in series.

5. The multi-stage voltage regulating circuit as defined in claim 4, wherein the switch set consists of a PMOS transistor and a NMOS transistor.

6. The multi-stage voltage regulating circuit as defined in claim 1, wherein the reference voltage output by the temperature compensator is between a high limit voltage value and a low limit voltage value.

7. The multi-stage voltage regulating circuit as defined in claim 1, wherein said comparative unit further comprises:

a comparator having a first input end, a second input end and an output end with said first input end receiving the reference voltage and the output end outputting said comparative signal;

a first resistor with an end being connected to said output power source and another end being connected to said second input end; and a second resistor with an end being connected to said second input end and another end being grounded.

8. A method of multi-stage voltage regulation with automatic temperature compensation adaptable for automatically regulating a voltage of an output power source of a voltage regulating circuit according to an ambient temperature, wherein the voltage regulating circuit has a plurality of charge-pumps with each of the charge-pumps connecting with an input power source respectively, comprising following steps:

detecting the ambient temperature and outputting a reference voltage according to said ambient temperature;

comparing the voltage of the output power source to said reference voltage and outputting a comparative signal according to the comparison;

controlling charging/discharging operations of said charge-pumps based on said comparative signal and voltages of input power sources connected to said charge-pumps and automatically regulating the voltage of said output power source.

9. The method of multi-stage voltage regulation as defined in claim 8, wherein the step of controlling charging/discharging operations of said charge-pumps further comprises:

determining that which ones of said charge-pumps should be enabled according to the voltages of the input power sources connected to said charge-pumps and the voltage of said output power source;

controlling charging/discharging operations of said enabled charge-pumps based on said comparative signal.

10. The method of multi-stage voltage regulation as defined in claim 8, wherein a sum of the voltages of the input power sources connected to the enabled charge-pumps is at least greater than the voltage of the output power source a preset value.

11. The method of multi-stage voltage regulation as defined in claim 8, wherein said reference voltage is between a high limit voltage value and a low limit voltage.

* * * * *